(12) United States Patent
Nam

(10) Patent No.: US 10,804,581 B2
(45) Date of Patent: Oct. 13, 2020

(54) RADIO FREQUENCY FILTER APPARATUS AND RADIO FREQUENCY MODULE

(71) Applicant: Samsung Electro-Mechanics Co., Ltd., Suwon-si (KR)

(72) Inventor: Joong Jin Nam, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 54 days.

(21) Appl. No.: 16/266,158

(22) Filed: Feb. 4, 2019

(65) Prior Publication Data
US 2020/0076031 A1 Mar. 5, 2020

(30) Foreign Application Priority Data
Sep. 4, 2018 (KR) .................. 10-2018-0105441

(51) Int. Cl.
| | | |
|---|---|---|
| H01P 1/20 | (2006.01) | |
| H01Q 1/48 | (2006.01) | |
| H01Q 9/04 | (2006.01) | |
| H01Q 21/06 | (2006.01) | |
| H01Q 1/22 | (2006.01) | |
| H04B 1/38 | (2015.01) | |
| H01P 1/203 | (2006.01) | |

(52) U.S. Cl.
CPC .............. *H01P 1/20* (2013.01); *H01Q 1/2283* (2013.01); *H01Q 1/48* (2013.01); *H01Q 9/0407* (2013.01); *H01Q 21/065* (2013.01); *H04B 1/38* (2013.01)

(58) Field of Classification Search
CPC .. H01P 1/203; H01P 1/20327; H01P 1/20381; H01P 1/2013; H01P 7/08; H01P 7/082; H01P 7/086; H01Q 1/273; H01Q 1/38; H01Q 21/30; H01Q 1/48; H01Q 15/0053; H01Q 9/0414; H01Q 1/2241; H01Q 3/26; H01Q 7/00; H01Q 13/16; H01Q 13/18; H01Q 15/0086
USPC .......... 343/700 MS, 753, 702, 705; 333/204, 333/219
See application file for complete search history.

(56) References Cited

U.S. PATENT DOCUMENTS

| | | | |
|---|---|---|---|
| 9,270,254 B2 | 2/2016 | Zuo et al. | |
| 2012/0098349 A1* | 4/2012 | Kim | ..................... H04B 5/0037 307/104 |
| 2016/0204754 A1 | 7/2016 | Kawamura | |

FOREIGN PATENT DOCUMENTS

| | | |
|---|---|---|
| JP | 2002-100698 A | 4/2002 |
| JP | 6161715 B2 | 7/2017 |
| KR | 10-2011-005967 A | 6/2011 |

* cited by examiner

*Primary Examiner* — Wei (Victor) Y Chan
(74) *Attorney, Agent, or Firm* — NSIP Law

(57) ABSTRACT

A radio frequency filter apparatus includes: radio frequency filters each having a first ring-type pattern extended from a respective first port and a second ring-type pattern extended from a respective second port; a cover ground layer disposed on or below the radio frequency filters and disposed to cover at least a portion of each of the radio frequency filters; and a surrounding ground layer disposed to surround at least a portion of each of the radio frequency filters along outer boundaries of the radio frequency filters, wherein the surrounding ground layer is spaced apart from radio frequency filters such that a shortest distance between the radio frequency filters and the surrounding ground layer is 8/5 or more times a shortest distance between the radio frequency filters and the cover ground layer.

10 Claims, 10 Drawing Sheets

# RADIO FREQUENCY FILTER APPARATUS AND RADIO FREQUENCY MODULE

CROSS-REFERENCE TO RELATED APPLICATIONS

This application claims the benefit under 35 U.S.C. § 119(a) of Korean Patent Application No. 10-2018-0105441 filed on Sep. 4, 2018 in the Korean Intellectual Property Office, the entire disclosure of which is incorporated herein by reference for all purposes.

BACKGROUND

1. Field

The following description relates a radio frequency filter apparatus and a radio frequency module.

2. Description of Related Art

Mobile communications data traffic is rapidly increasing every year. Technological developments are being undertaken so as to support such rapidly increasing data in real time in a wireless network. For example, applications such as Internet of Things (IoT), augmented reality (AR), virtual reality (VR), live VR/AR combined with Social Network Services (SNS), autonomous driving, sync view (in which a real time image of a user point of view is transmitted using a ultra small camera), and the like, require communications (e.g., 5G communications, mmWave communications, etc.) for supporting the transmission and reception of large amounts of data.

Therefore, recently, millimeter wave (mmWave) communications including 5th (5G) communications have been researched, and research into the commercialization/standardization of a radio frequency module for smoothly implementing millimeter wave communications is also being performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radio frequency filter apparatus includes: radio frequency filters each having a first ring-type pattern extended from a respective first port and a second ring-type pattern extended from a respective second port; a cover ground layer disposed on or below the radio frequency filters and disposed to cover at least a portion of each of the radio frequency filters; and a surrounding ground layer disposed to surround at least a portion of each of the radio frequency filters along outer boundaries of the radio frequency filters, wherein the surrounding ground layer is spaced apart from radio frequency filters such that a shortest distance between the radio frequency filters and the surrounding ground layer is 8/5 or more times a shortest distance between the radio frequency filters and the cover ground layer.

A shortest distance between pairs of the first ring-type pattern and the second ring-type pattern may be shorter than the shortest distance between the radio frequency filters and the surrounding ground layer.

A shortest distance from a portion of each of the first ring-type pattern and the second ring-type pattern to an opposite portion of the first ring-type pattern and the second ring-type pattern, respectively, may be longer than the shortest distance between the radio frequency filters and the surrounding ground layer.

A thickness of each of the radio frequency filters may be greater than or equal to 0.2 times and less than or equal to 0.4 times the shortest distance between the radio frequency filters and the cover ground layer.

The radio frequency filters may be disposed such that a shortest distance between adjacent radio frequency filters among the radio frequency filters is 6 or more times the shortest distance between the radio frequency filters and the cover ground layer.

At least a portion of the pairs of the first ring-type pattern and the second ring-type pattern may have a pair of slits. Slits of the pair of slits may be disposed at positions facing each other in a corresponding ring-type pattern among the first ring-type pattern and the second ring-type pattern.

The radio frequency filter apparatus may further include an internal ground layer disposed inside of at least a portion of one of the first ring-type pattern and the second ring-type pattern. A shortest distance between the one of the first ring-type pattern and the second ring-type pattern and the internal ground layer may be 8/5 or more times the first shortest distance.

In another general aspect, a radio frequency filter apparatus includes: radio frequency filters each having a first ring-type pattern extended from a respective first port and a second ring-type pattern extended from a respective second port; a cover ground layer disposed on or below the radio frequency filters and disposed to cover at least a portion of each of the radio frequency filters; and a surrounding ground layer disposed to surround at least a portion of each of the frequency filters along outer boundaries of the radio frequency filters, wherein the radio frequency filters are disposed such that a shortest distance between adjacent radio frequency filters among the radio frequency filters is 6 or more times a shortest distance between the radio frequency filters and the cover ground layer.

A shortest distance from a portion of each of the first ring-type pattern and the second ring-type pattern to an opposite portion of the first ring-type pattern and the second ring-type pattern, respectively, may be longer than the shortest distance between the adjacent radio frequency filters among the radio frequency filters.

A thickness of each of the radio frequency filters may be greater than or equal to 0.2 times and less than or equal to 0.4 times the shortest distance between the radio frequency filters and the cover ground layer.

In another general aspect, a radio frequency module includes: an integrated circuit (IC); an antenna layer including patch antennas respectively electrically connected to the IC; radio frequency filters each electrically connected to a corresponding patch antenna among the patch antennas and disposed between the IC and the antenna layer; a surrounding ground layer disposed to surround at least a portion of each of the radio frequency filters along outer boundaries of the radio frequency filters; and a cover ground layer disposed between the radio frequency filters and the antenna layer or between the radio frequency filters and the IC, and disposed to cover at least a portion of each of the radio frequency filters, wherein the surrounding ground layer is disposed such that a shortest distance between the radio frequency filters and the surrounding ground layer is 8/5 or more times a shortest distance between the radio frequency filters and the cover ground layer.

The radio frequency filters may be disposed such that a shortest distance between adjacent radio frequency filters among the radio frequency filters is 6 or more times the shortest distance between the radio frequency filters and the cover ground layer.

The radio frequency module of may further include shielding vias disposed to electrically connect the cover ground layer and the surrounding ground layer to each other, and arranged along an inner boundary of the surrounding ground layer.

The cover ground layer may include a first cover ground layer disposed between the radio frequency filters and the IC, and disposed to cover at least a portion of each of the radio frequency filters, and a second cover ground layer disposed between the radio frequency filters and the antenna layer, and disposed to cover at least a portion of each of the radio frequency filters.

The radio frequency module may further include a core member disposed below the second cover ground layer and configured to pass a base signal. The IC may be configured to receive the base signal through the core member and to transmit a radio frequency signal having a frequency higher than a frequency of the base signal to the patch antennas.

The radio frequency signal may have a fundamental frequency of greater than or equal to 20 GHz and less than or equal to 80 GHz.

In another general aspect, a radio frequency module includes: an integrated circuit (IC); an antenna layer including patch antennas, respectively electrically connected to the IC; radio frequency filters each electrically connected to a corresponding patch antenna among the patch antennas and disposed between the IC and the antenna layer; a surrounding ground layer disposed to surround at least a portion of each of the radio frequency filters along outer boundaries of the radio frequency filters; and a cover ground layer disposed between the radio frequency filters and the antenna layer or between the first to frequency filters and the IC, and disposed to cover at least a portion of each of the radio frequency filters, wherein the radio frequency filters are disposed such that a shortest distance between adjacent radio frequency filters among the radio frequency filters is 6 or more times a shortest distance between the radio frequency filters and the cover ground layer.

The radio frequency module may further include shielding vias disposed to electrically connect the cover ground layer and the surrounding ground layer to each other, and arranged along an inner boundary of the surrounding ground layer.

The radio frequency module may further include a core member disposed below the surrounding ground layer and configured to pass a base signal. The IC may be configured to receive the base signal through the core member and to transmit a radio frequency signal having a frequency higher than a frequency of the base signal to patch antennas.

The radio frequency signal may have a fundamental frequency of greater than or equal to 20 GHz and less than or equal to 80 GHz.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
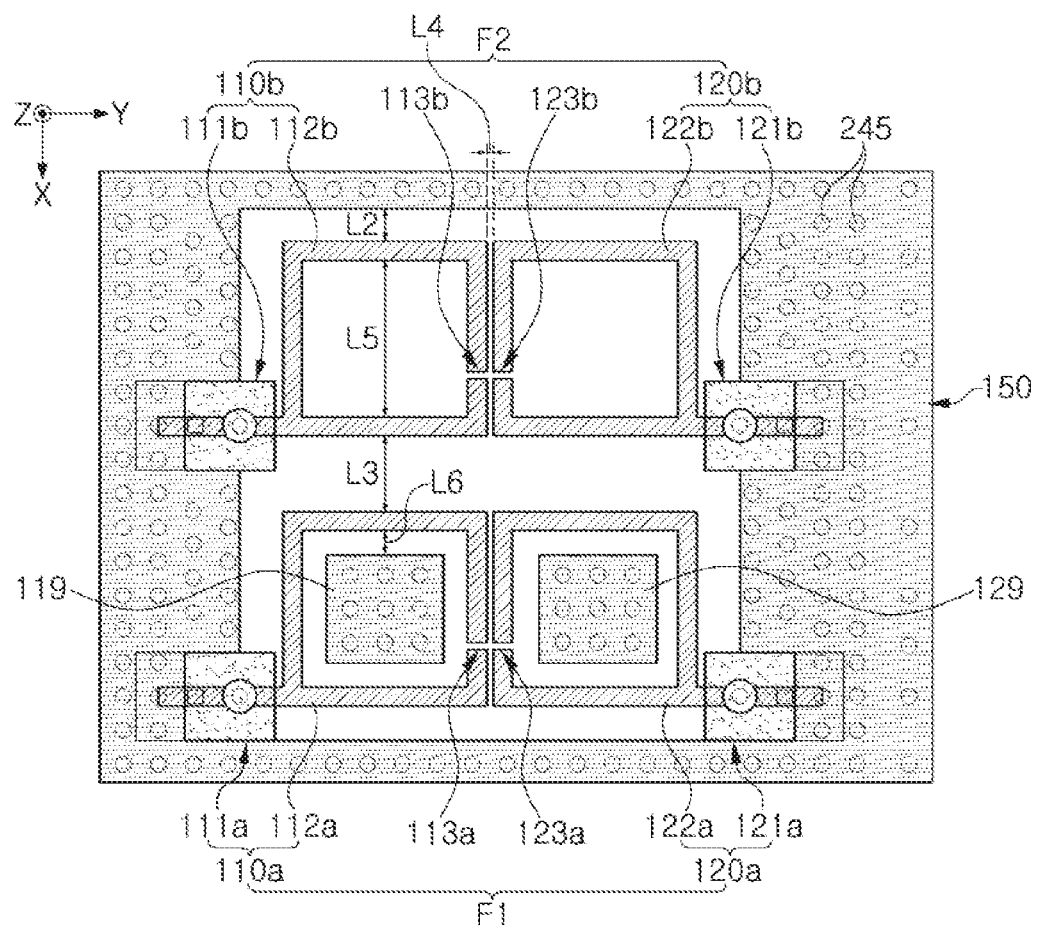
FIG. 1A is a plan view illustrating a radio frequency filter apparatus, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The following description references first through sixth shortest distances L1 through L6. The numerical order descriptors "first", "second", "third", "fourth", "fifth", and "sixth" associated with the respective shortest distances L1 through L6 do not indicate a length or shortness with respect to other distances. Instead, the numerical order descriptors "first", "second", "third", "fourth", "fifth", and "sixth" associated with the respective shortest distances L1 through L6 are merely provided as unique identifiers to distinguish the various shortest distances L1 through L6 from one another.

Figure 1B:
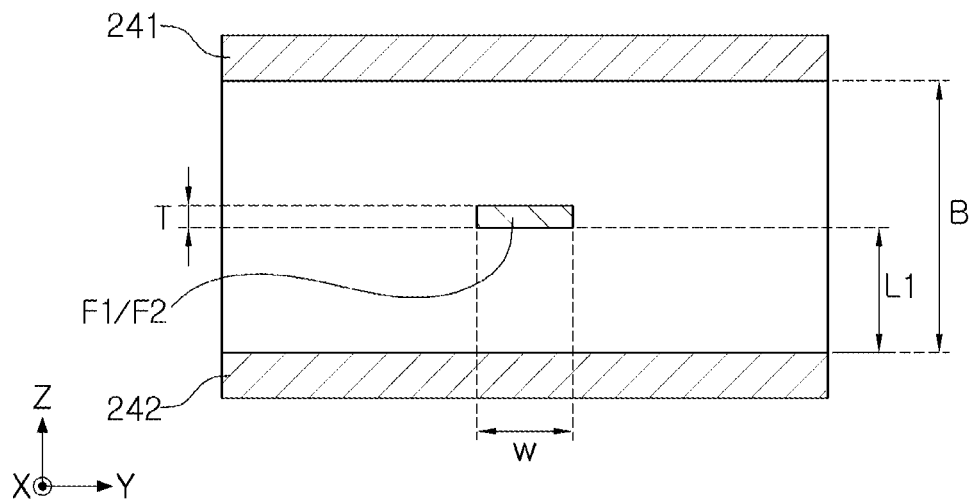
FIG. 1B is a side view illustrating the radio frequency filter apparatus of FIG. 1A, according to an embodiment.

FIG. 1A is a plan view (a view point in a Z direction) illustrating a radio frequency filter apparatus, according to an embodiment. FIG. 1B is a side view (a view point in an X direction) illustrating the radio frequency filter apparatus of FIG. 1A, according to an embodiment.

Referring to FIGS. 1A and 1B, the radio frequency filter apparatus may include first to n-th radio frequency filters F1 and F2, a first cover ground layer 242, and a surrounding ground layer 150. In the description herein, n is defined as a natural number which is 2 or more, and in FIGS. 1A and 1B, a case in which n is 2 is assumed for the sake of clarity of explanation.

Each of the radio frequency filters F1 and F2 may have respective first ring-type patterns 112a and 112b extended from first ports 111a and 111b, respectively, and respective second ring-type patterns 122a and 122b extended from second ports 121a and 121b, respectively.

One of the first ports 111a and 111b and the second ports 121a and 121b may receive a radio frequency signal from a via, and the other of the first ports 111a and 111b and the second ports 121a and 121b may transmit the radio frequency signal to another via. For example, the first ports 111a and 111b may receive a radio signal from respective vias and the second ports 121a and 121b may transmit the radio signal to other respective vias. Alternatively, the second ports 121a and 121b may receive a radio signal from respective vias and the first ports 111a and 111b may transmit the radio signal to other respective vias. In addition, the first ports 111a and 111b and the n−2-th ports 121a and 121b may be disposed to be spaced apart from the surrounding ground layer 150.

The first ring-type patterns 112a and 112b and the second ring-type patterns 122a and 122b may be electrically connected to the first ports 111a and 111b and the second ports 121a and 121b, respectively, and may be disposed between the first ports 111a and 111b and the second ports 121a and 121b.

Since the first ring-type patterns 112a and 112b and the second ring-type patterns 122a and 122b may have inductances and capacitances according to a ring type, a plurality of resonance frequencies corresponding to combinations of the inductances and the capacitances may be provided. A difference frequency between the plurality of resonance frequencies may correspond to a bandwidth of the radio frequency filters F1 and F2.

The radio frequency filters F1 and F2 may be vulnerable to adjacent electromagnetic noise.

The first cover ground layer 242 may be disposed below the radio frequency filters F1 and F2 and may be disposed to cover at least a portion of each of the radio frequency filters F1 and F2. Accordingly, the radio frequency filters F1 and F2 may be electromagnetically shielded from a lower electromagnetic noise source (e.g., IC, PMIC, external noise, etc.).

A second cover ground layer 241 may be disposed on the radio frequency filters F1 and F2 and may be disposed to cover at least a portion of each of the radio frequency filters F1 and F2. Accordingly, the radio frequency filters F1 and F2 may be electromagnetically shielded from an upper electromagnetic noise source (e.g., patch antenna, external noise, etc.).

The surrounding ground layer 150 may be disposed to surround at least a portion of each of the radio frequency filters F1 and F2 along outer boundaries of radio frequency filters F1 and F2. Accordingly, the radio frequency filters F1 and F2 may be electromagnetically shielded from an electromagnetic noise source (e.g., dipole antenna, chip antenna, external noise, etc.) in a lateral direction.

Figure 5:
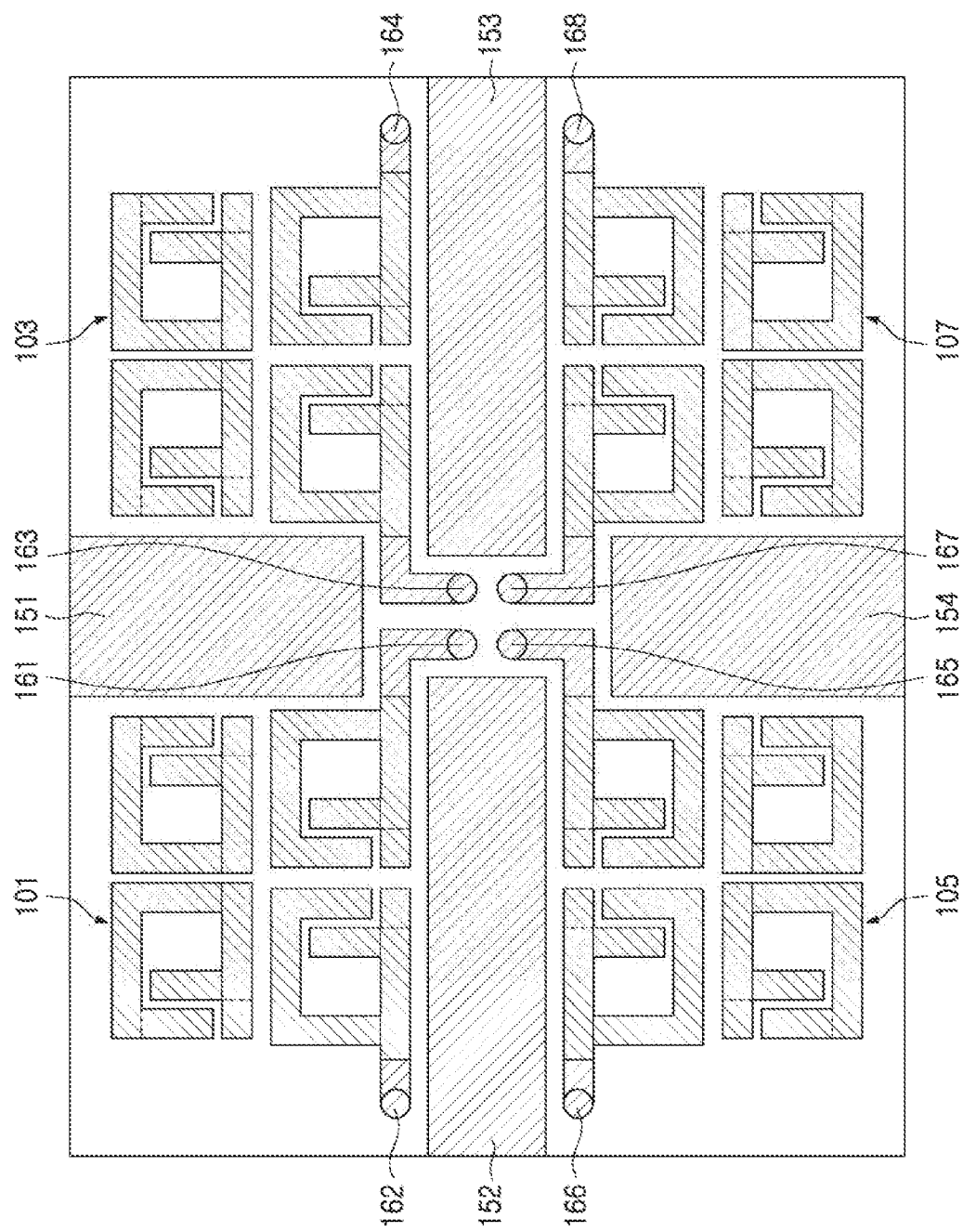
FIG. 5 is a plan view illustrating a filter layer on which a radio frequency filter apparatus is arranged, according to an embodiment.

For example, the surrounding ground layer 150 may be disposed to surround an entirety of the radio frequency filters F1 and F2 as illustrated in FIG. 1A, and may also be disposed to surround portions of the radio frequency filters F1 and F2 as illustrated in FIG. 5, depending on a design objective.

Figure 4:
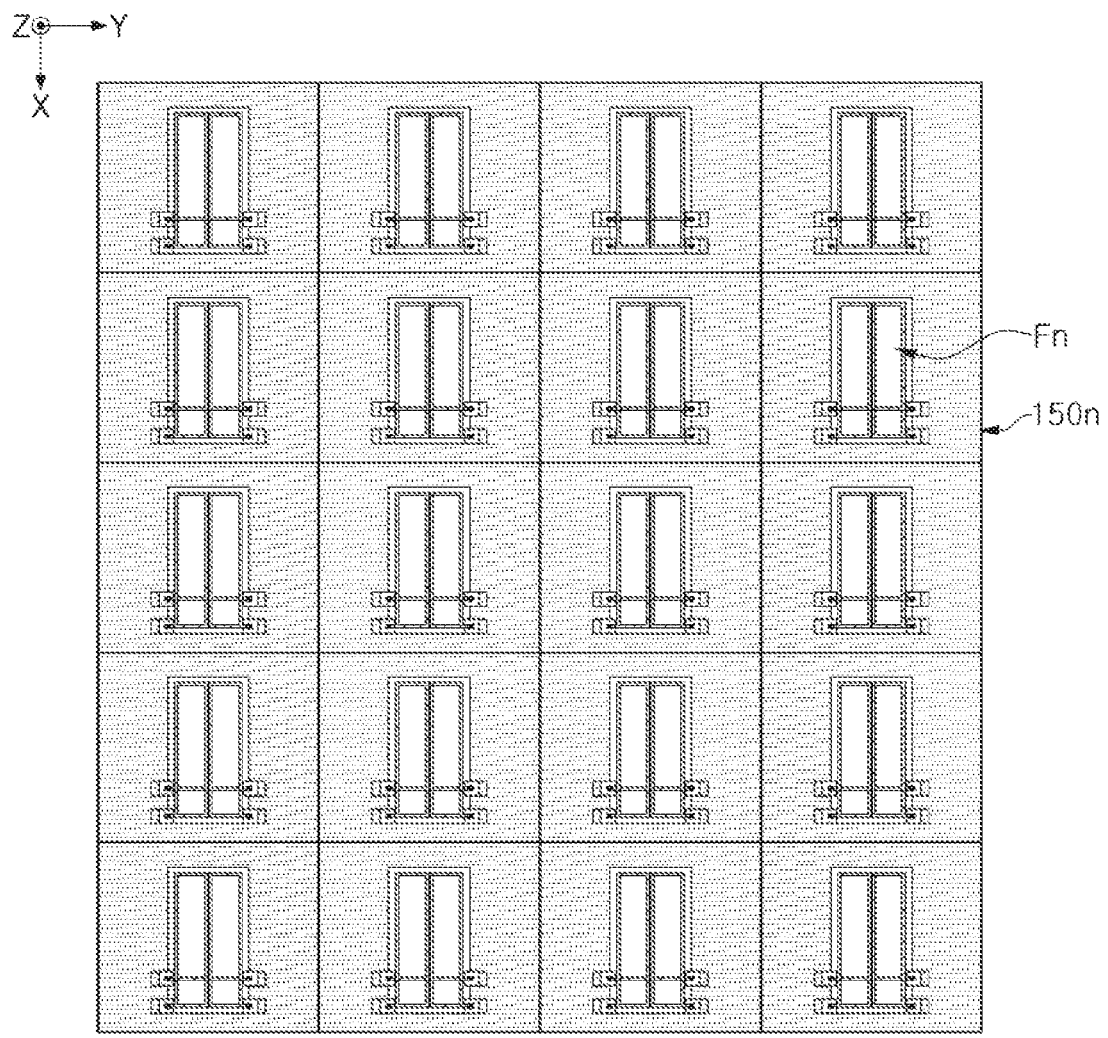
FIG. 4 is a plan view illustrating a form of a surrounding ground layer of a radio frequency filter apparatus, according to an embodiment.

In addition, the surrounding ground layer 150 may be disposed to surround the radio frequency filters F1 and F2 together as illustrated in FIG. 1A, and may also be disposed to surround the radio frequency filters F1 and F2, respectively, as illustrated in FIG. 4, depending on the design objective.

The first cover ground layer 242, the second cover ground layer 241, and the surrounding ground layer 150 may provide a parasitic capacitance to the radio frequency filters F1 and F2 when they are disposed too close to the radio frequency filters F1 and F2. The parasitic capacitance may cause deterioration of the performance (for example, insertion loss, isolation, etc.) of the radio frequency filters F1 and F2.

The shortest distance to the radio frequency filters F1 and F2 from the surrounding ground layer 150 may be relatively easily adjusted compared to of the shortest distance to the radio frequency filters F1 and F2 from the first cover ground layer 242 and the second cover ground layer 241.

TABLE 1

| distance [um] | IL [dB] |
|---|---|
| 150 | 1.16 |
| 100 | 1.16 |
| 80 | 1.16 |
| 50 | 1.18 |
| 30 | 1.32 |

Table 1 shows insertion loss IL of the radio frequency filters F1 and F2 according to a second shortest distance L2 between the radio frequency filters F1 and F2 and the surrounding ground layer 150 when a first shortest distance L1 between the radio frequency filters F1 and F2 and the first cover ground layer 242 is 50 μm. The insertion loss IL may be defined as a peak value in an S-parameter spectrum between the first ports 111a and 111b and the second ports 121a and 121b.

Referring to Table 1, the insertion loss IL of the radio frequency filters F1 and F2 may have characteristics substantially independent of a change of the second shortest distance L2 when the second shortest distance L2 is 80 μm or more, and may have characteristics that the insertion loss IL is increased as the second shortest distance L2 becomes shorter when the second shortest distance L2 is 80 μm or less.

Therefore, the surrounding ground layer 150 may be disposed to be spaced apart from the radio frequency filters F1 and F2 such that the second shortest distance L2 is 8/5 or more times the first shortest distance L1.

An influence of the electromagnetic noise on the radio frequency filters F1 and F2 may be reduced as the surrounding ground layer 150 is disposed closer to the radio frequency filters F1 and F2. That is, since the surrounding ground layer 150 may be disposed close to the radio frequency filters F1 and F2 while maintaining a condition in which the second shortest distance L2 is 8/5 or more times the first shortest distance L1, the radio frequency filter apparatus may reduce the influence of the electromagnetic noise and may reduce the insertion loss.

In addition, an integrated region of the radio frequency filters F1 and F2 may be designed such that the second shortest distance L2 is 8/5 or more times the first shortest distance L1. That is, since the radio frequency filters F1 and F2 may efficiently use the integrated region while maintaining the condition in which the second shortest distance L2 is 8/5 or more times the first shortest distance L1, the radio frequency filter apparatus may reduce the insertion loss while optimizing a performance and/or a size of the radio frequency filter.

In a case in which a spacing distance between the radio frequency filters F1 and F2 is too short, the radio frequency filters F1 and F2 may provide parasitic capacitance to each other to cause electromagnetic interference.

In a case in which the spacing distance between the radio frequency filters F1 and F2 is too long, the integrated region of the radio frequency filters F1 and F2 may be too large.

TABLE 2

| distance | IL [dB] | Isolation [dB] |
|---|---|---|
| 430 | 1.15 | 64 |
| 300 | 1.15 | 68 |
| 240 | 1.14 | 54 |
| 150 | 1.15 | 47 |
| 100 | 1.15 | 35 |
| 50 | 1.18 | 23 |
| 28 | 1.24 | 19 |
| 15 | 1.67 | 13 |

Table 2 shows insertion loss IL and isolation of the radio frequency filters F1 and F2 according to a third shortest distance L3 between the radio frequency filters F1 and F2 when the first shortest distance L1 between radio frequency filters F1 and F2 and the first cover ground layer 242 is 50 μm. The isolation may be defined as an S-parameter value between the radio frequency filters F1 and F2 at the same frequency as the frequency of the insertion loss IL.

Referring to Table 2, the isolation of the radio frequency filters F1 and F2 may have characteristics that the isolation does not substantially increase even when the third shortest distance L3 increases when the third shortest distance L3 is 300 μm or more, and that the isolation is deteriorated as the third shortest distance L3 becomes shorter when the third shortest distance L3 is 300 μm or less.

Therefore, the radio frequency filters F1 and F2 may be disposed to be spaced apart from each other such that the third shortest distance L3 is 6 or more times the first shortest distance L1.

Accordingly, the radio frequency filter apparatus may improve the degree of integration of the radio frequency filters F1 and F2 while improving the isolation between the radio frequency filters F1 and F2.

The first shortest distance L1 may vary depending on a vertical direction thickness T of the frequency filters F1 and F2. The vertical direction thickness T may be greater than or equal to 0.2 times and less than or equal to 0.4 times the first shortest distance L1. In a case in which the vertical direction thickness T is less than 0.2 times the first shortest distance L1, since a resistance value of the radio frequency filters F1 and F2 may be increased, the insertion loss of the radio frequency filters F1 and F2 may be increased. In a case in which the vertical direction thickness T exceeds 0.4 times the first shortest distance L1, since a deviation of the first shortest distance L1 according to a manufacturing process may be large, reliability of the radio frequency filters F1 and F2 may be lowered.

A fourth shortest distance L4 between the n pairs of the first ring-type patterns 112a and 112b and the second ring-type patterns 122a and 122b may be shorter than the second shortest distance L2. Accordingly, since the radio frequency signal may more easily pass between the first ring-type patterns 112a and 112b and the second ring-type patterns 122a and 122b, the insertion loss of the radio frequency filters F1 and F2 may be reduced.

A fifth shortest distance L5 from a portion of each of the first ring-type patterns 112a and 112b and the second ring-type patterns 122a and 122b to another opposite portion of the first ring-type patterns 112a and 112b and the second ring-type patterns 122a and 122b, respectively, may be longer than the second shortest distance L2 and/or the third shortest distance L3. Accordingly, since the first ring-type patterns 112a and 112b and the second ring-type patterns 122a and 122b may provide larger inductance, a resonance frequency of the radio frequency filters F1 and F2 may be easily tuned to a frequency of the radio frequency signal.

In addition, the radio frequency filter apparatus may further include one or more internal ground layers 119 and 129 disposed inside of at least portions of the first ring-type patterns 112a and 112b and the second ring-type patterns 122a and 122b, respectively. The one or more internal ground layers 119 and 129 may improve reliability (e.g., a deviation according to a manufacturing process) of inductance and capacitance according to a ring shape of the first ring-type patterns 112a and 112b and the second ring-type patterns 122a and 122b.

A sixth shortest distance L6 between the ring-type patterns 112a/11213 and 122a/12213 respectively surrounding the one or more internal ground layers 119 and 129 and the corresponding internal ground layers 119 and 129 may be 8/5 or more times the first shortest distance L1. That is, since the internal ground layers 119 and 129 may electromagnetically act on a principle similar to the surrounding ground layer 150, the internal ground layers 119 and 129 may be disposed such that the sixth shortest distance L6 is 8/5 or more times the first shortest distance L1, thereby reducing the parasitic capacitance.

At least some of n pairs of the first ring-type patterns 112a and 112b and the second ring-type patterns 122a and 122b may have a pair of slits 113a, 123a and 113b, 123b, respectively, and slits of the pair of slits may be disposed at a position facing each other in a corresponding ring-type pattern. Accordingly, the pairs of slits 113a, 123a and 113b, 123b may improve reliability (e.g., a deviation according to a process) of inductance and capacitance according to a ring shape of the first ring-type patterns 112a and 112b and the second ring-type patterns 122a and 122b.

In addition, the radio frequency filter apparatus may further include shielding vias 245 disposed to electrically connect the first ground layer 242 and the surrounding ground layer 150 to each other and arranged along an inner boundary of the surrounding ground layer 150. Accordingly, the electromagnetic noise on the radio frequency filter apparatus may be further reduced.

A spacing interval B between the first cover ground layer 242 and the second cover ground layer 241 may be the sum of twice of the first shortest distance L1 and the vertical direction thickness T. That is, the shortest distance between the second cover ground layer 241 and the radio frequency filter F1/F2 may be the same as the first shortest distance L1.

A pattern width W of the radio frequency filter F1/F2 may vary depending on a design of the resonance frequency.

Meanwhile, the first ring-type patterns 112a and 112b and the second ring-type patterns 122a and 122b may be symmetrical to each other, but may also be asymmetrical to each other according to the design of the resonance frequency.

Figure 1C:
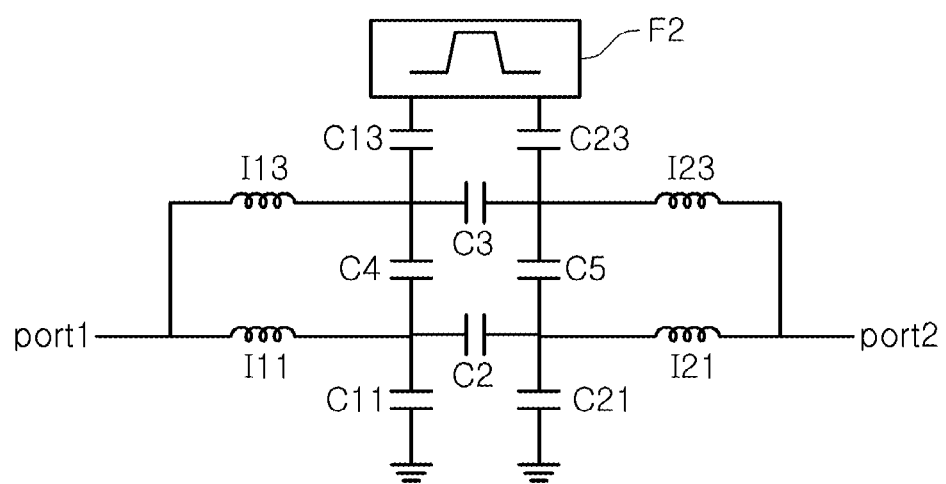
FIG. 1C is a circuit diagram illustrating the radio frequency filter apparatus of FIGS. 1A and 1B, according to an embodiment.

FIG. 1C is a circuit diagram illustrating the radio frequency filter apparatus of FIGS. 1A and 1B, according to an embodiment.

Referring to FIG. 1C, the resonance frequency of the radio frequency filter apparatus may be determined based on inductances 111 and 113 of the first ring-type patterns 112a and 112b, inductances 121 and 123 of the second ring-type patterns 122a and 122b, a capacitance C4 of the first ring-type patterns 112a and 112b, a capacitance C5 of the second ring-type patterns 122a and 122b, and capacitances C2 and C3 between the first ring-type patterns 112a and 112b and the second ring-type patterns 122a and 122b.

The radio frequency filter apparatus may reduce a parasitic capacitance C11 between the first ring-type patterns 112a and 112b and the surrounding ground layer 150 and a parasitic capacitance C21 between the second ring-type patterns 122a and 122b and the surrounding ground layer 150 to thereby improve the insertion loss and to be miniaturized.

The radio frequency filter apparatus may reduce a parasitic capacitance C13 between a ring-type pattern of the second radio frequency filter F2 and the first ring-type patterns 112a and 112b and a parasitic capacitance C23 between a ring-type pattern of the second radio frequency filter F2 and the second ring-type patterns 122a and 122b to thereby reduce the isolation and to be miniaturized.

The resonance frequency of the radio frequency filter apparatus may be easily tuned to a radio frequency signal having a fundamental frequency of greater than or equal to 20 GHz and less than or equal to 80 GHz.

Figure 2A:
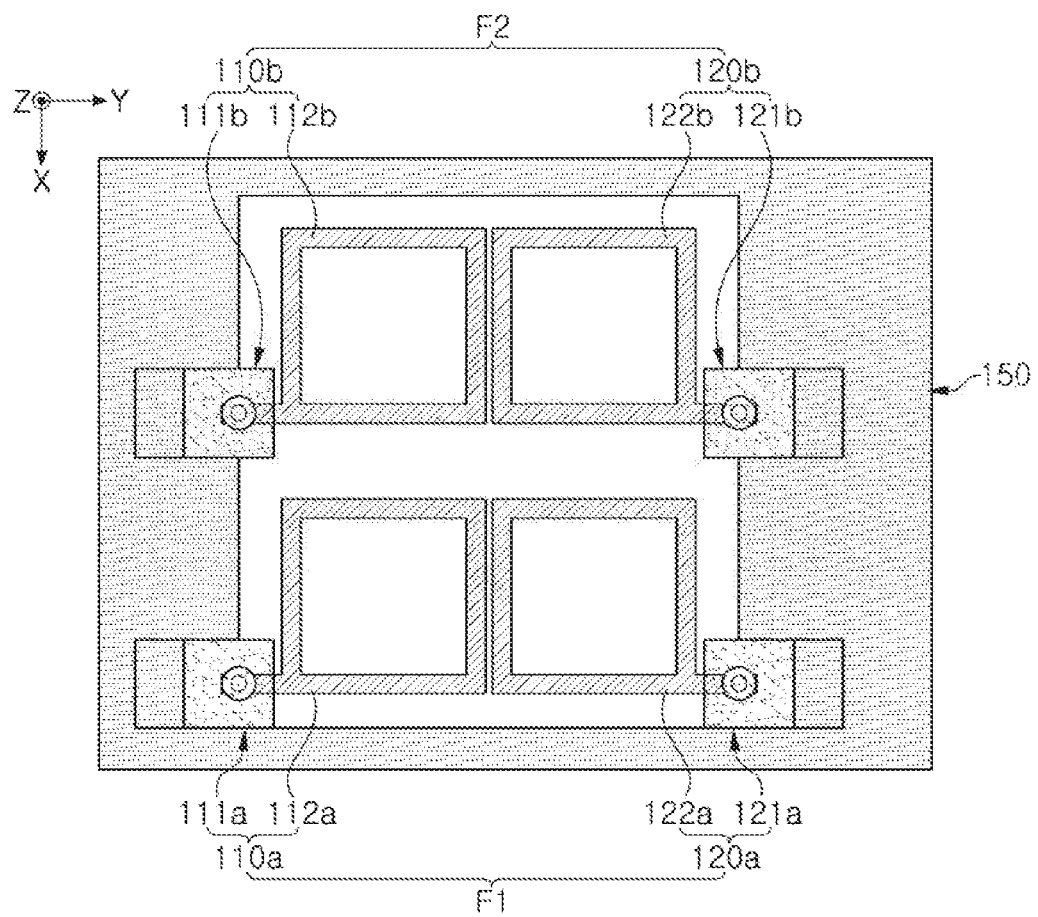
FIG. 2A is a plan view illustrating a radio frequency filter apparatus, according to an embodiment.
Figure 2B:
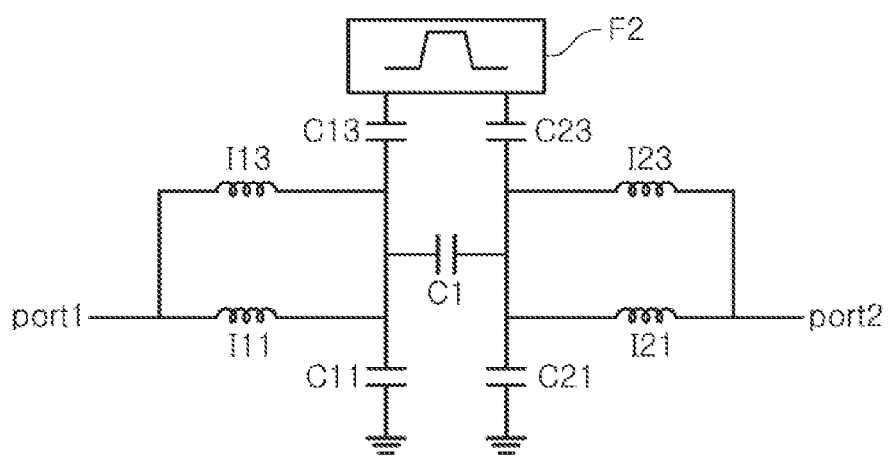
FIG. 2B is a circuit diagram illustrating the radio frequency filter apparatus of FIG. 2A, according to an embodiment.

FIG. 2A is a plan view illustrating a radio frequency filter apparatus, according to an embodiment. FIG. 2B is a circuit diagram illustrating the radio frequency filter apparatus of FIG. 2A.

Referring to FIG. 2A, the radio frequency filter apparatus may have a structure in which the pairs of slits 113a, 123a and 113b, 123b shown in FIGS. 1A to 10 and/or the internal ground layers 119 and 129 are omitted.

Referring to FIG. 2B, according to the omission of the pairs of slits and/or the internal ground layers, the capacitance provided by the first ring-type patterns 112a and 112b and the second ring-type patterns 122a and 122b may be modeled integrally into a single capacitance C1. That is, whether or not the pair of slits and/or the internal ground layers 119 and 129 are omitted may be determined according to the design of the resonance frequency.

Figure 3:
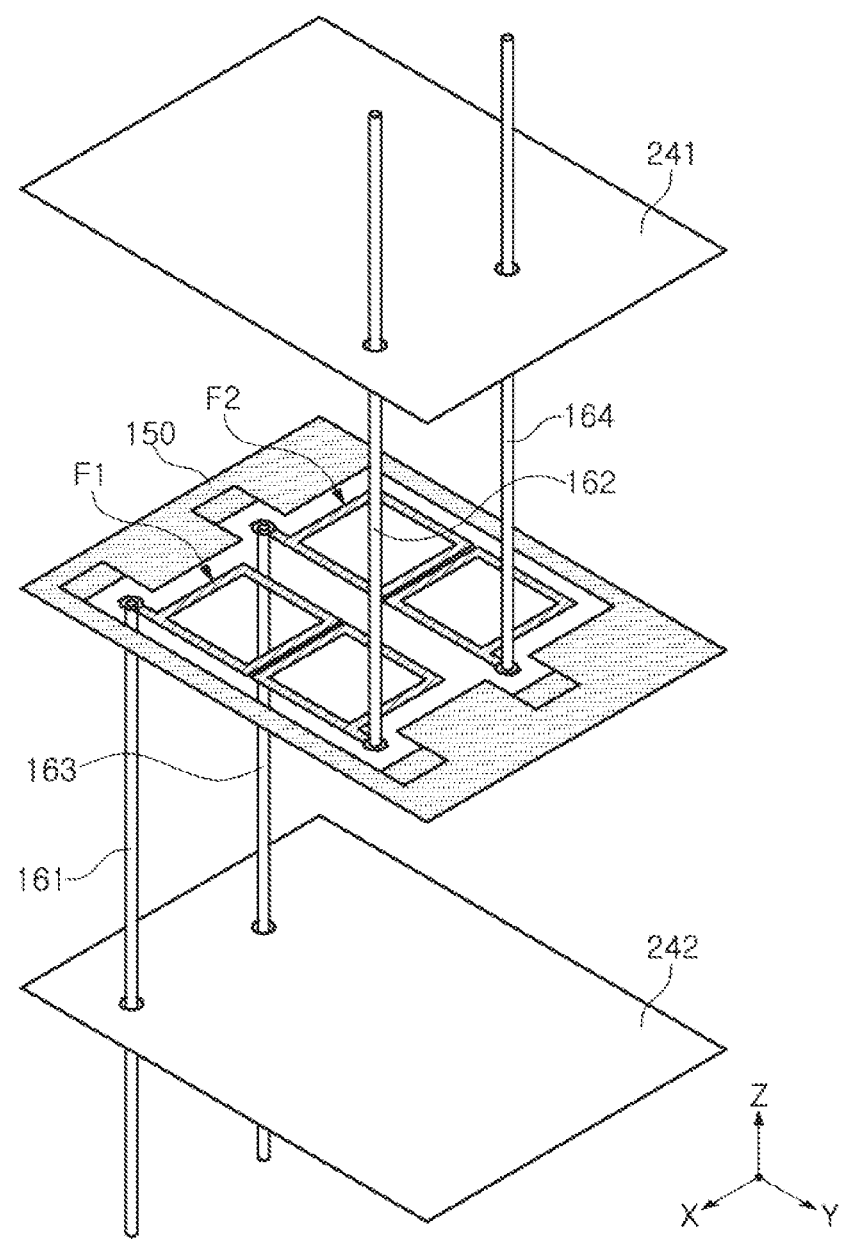
FIG. 3 is a perspective view illustrating a radio frequency filter apparatus, according to an embodiment.

FIG. 3 is a perspective view illustrating the radio frequency filter apparatus, according to an embodiment.

Referring to FIG. 3, some ports of each of the radio frequency filters F1 and F2 may be connected to upper vias 162 and 164, respectively, and the remaining ports may be connected to lower vias 161 and 163.

The first cover ground layer 242 may have through-holes through which the lower vias 161 and 163 respectively pass, and the second cover ground layer 241 may have through-holes through which the upper vias 162 and 164 respectively pass.

FIG. 4 is a plan view illustrating a form of a surrounding ground layer 150n of a radio frequency filter apparatus, according to an embodiment.

Referring to FIG. 4, the surrounding ground layer 150n may be disposed to surround each of radio frequency filters Fn. In FIG. 4, n is assumed to be 20. However, n may be any natural number of 2 or more.

FIG. 5 is a view illustrating a filter layer on which a radio frequency filter apparatus is arranged, according to an embodiment.

Referring to FIG. 5, the filter layer may include radio frequency filters 101, 103, 105, and 107, and surrounding ground layers 151, 152, 153, and 154. In FIG. 5, the number of radio frequency filters is assumed to be 4. However, the number of radio frequency filters may be any natural number greater than or equal to 2.

The number of ring-type patterns of each of the radio frequency filters 101, 103, 105, and 107 may be two but may be more than two.

The number of surrounding ground layers 151, 152, 153, and 154 may be plural, and each of the surrounding ground layers 151, 152, 153, and 154 may be disposed to surround a portion of each of the radio frequency filters 101, 103, 105, and 107, may be disposed to surround the entirety of the radio frequency filters 101, 103, 105, and 107 together similarly to the surrounding ground layer 150 illustrated in FIG. 1A depending on the design, and may be disposed to surround each of the frequency filters 101, 103, 105, and 107 similarly to the surrounding ground layer 150n illustrated in FIG. 4 depending on the design.

Lower vias 161, 163, 165, and 167 may be respectively electrically connected to a first port of each of the radio frequency filters 101, 103, 105, and 107, and may be disposed on a center region of the filter layer.

Upper vias 162, 164, 166, and 168 may be respectively electrically connected to a second port of each of the radio frequency filters 101, 103, 105, and 107, and may be disposed on an edge region of the filter layer.

Figure 6:
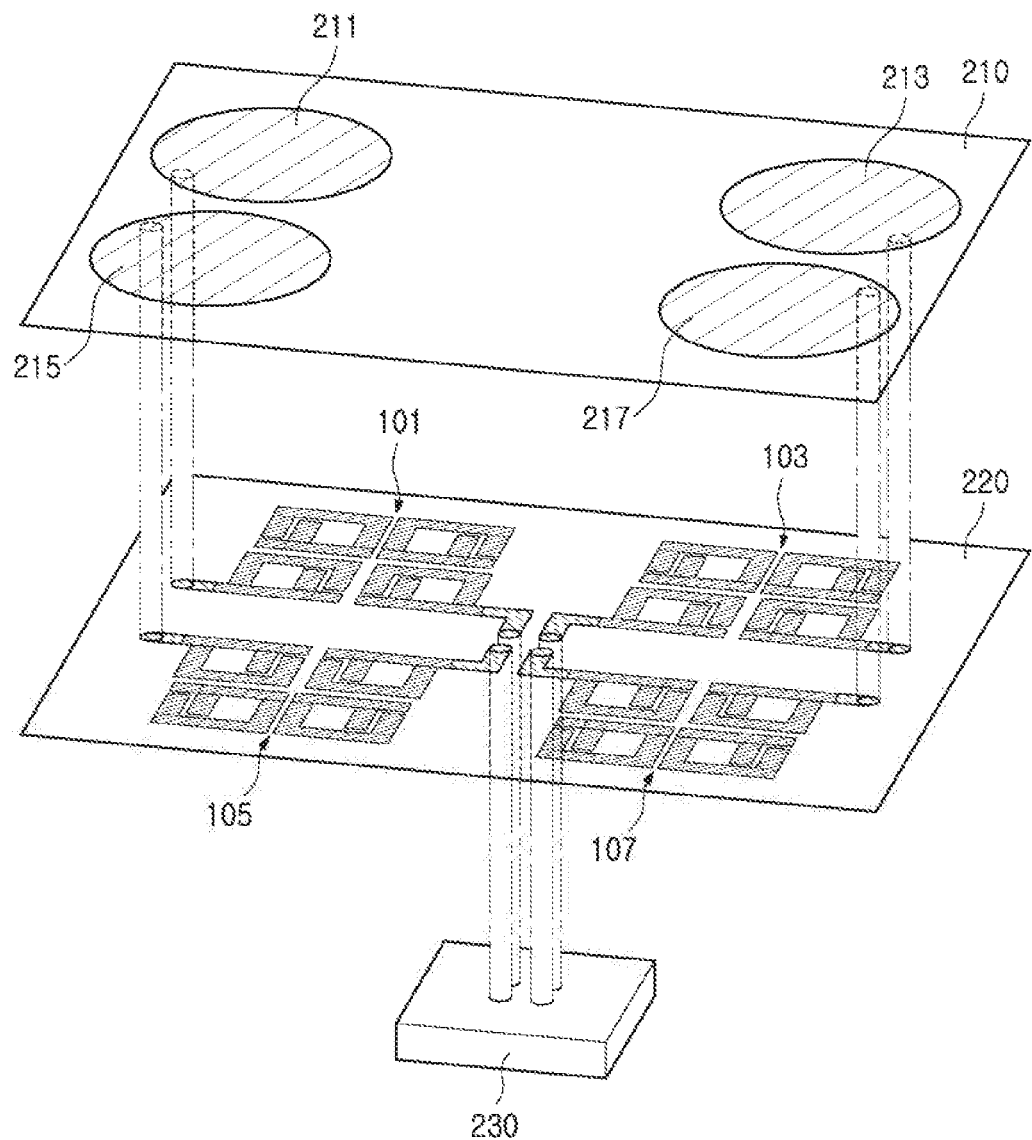
FIG. 6 is a perspective view illustrating a radio frequency module, according to an embodiment.

FIG. 6 is a perspective view illustrating a radio frequency module, according to an embodiment.

Referring to FIG. 6, the radio frequency module may include an IC 230, an antenna layer 210, and the radio frequency filters 101, 103, 105, and 107. In FIG. 6, the number of radio frequency filters is assumed to be 4. However, the number of radio frequency filters may be any natural number greater than or equal to 2.

The antenna layer 210 may include patch antennas 211, 213, 215, and 217 which are each electrically connected to the IC 230.

Each of the radio frequency filters 101, 103, 105, and 107 may be electrically connected to a corresponding patch antenna among the patch antennas 211, 213, 215, and 217, and may be disposed between the IC 230 and the antenna layer 210.

In addition, the radio frequency module may further include a surrounding ground layer (e.g., the surrounding ground layer 150 shown in FIG. 1A) disposed to surround at least a portion of each of the radio frequency filters 101, 103, 105, and 107 along outer boundaries of the radio frequency filters 101, 103, 105, and 107. Since the surrounding ground layer may be implemented in the same manner as the surrounding ground layers illustrated in FIGS. 1A through 5, the surrounding ground layer is not illustrated in FIG. 6.

Figure 7:
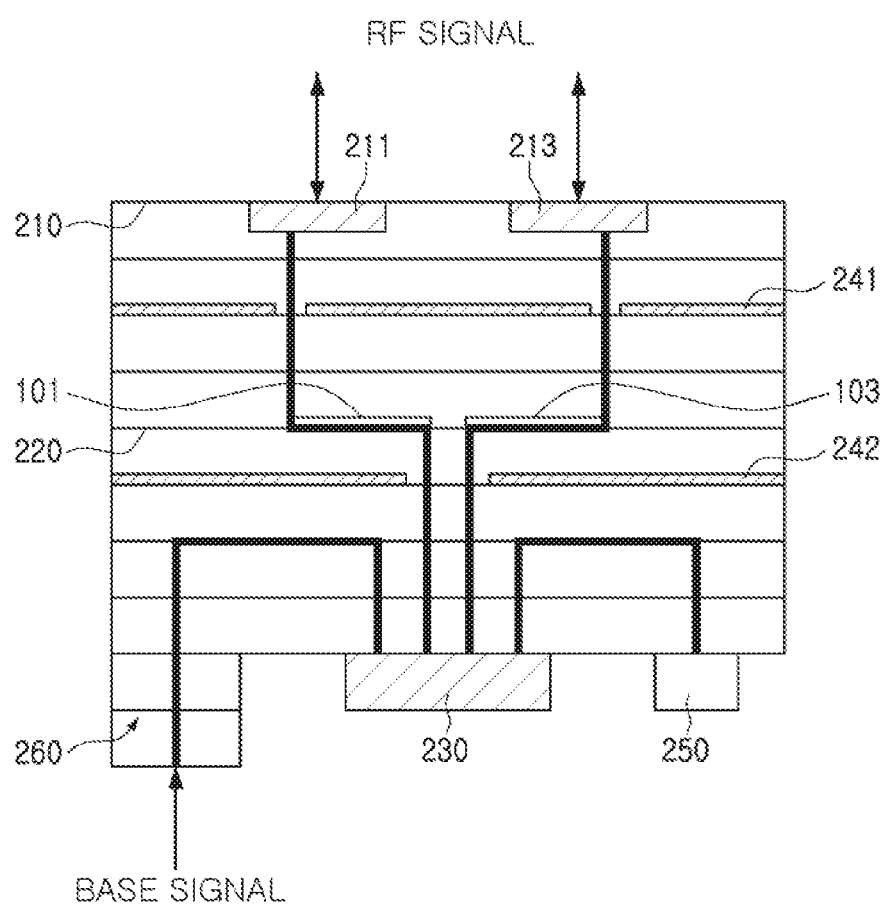
FIG. 7 is a side view illustrating the radio frequency module of FIG. 6, according to an embodiment.

FIG. 7 is a side view illustrating the radio frequency module of FIG. 6, according to an embodiment.

Referring to FIG. 7, the radio frequency module may further include at least portions of the first cover ground layer 242, the second cover ground layer 241, a passive component 250, and a core member 260.

The first cover ground layer 242 may be disposed between the radio frequency filters 101, 103, 105, and 107 and the IC 230, and may be disposed to cover at least a portion of each of the radio frequency filters 101, 103, 105, and 107 from below.

The second cover ground layer 241 may be disposed between the radio frequency filters 101, 103, 105, and 107 and the antenna layer 210, and may be disposed to cover at least a portion of each of the radio frequency filters 101, 103, 105, and 107 from above.

The surrounding ground layer included in the filter layer 220 may be disposed such that the second shortest distance L2 (see FIG. 1A) between the radio frequency filters 101, 103, 105, and 107 and the surround grounding layer is 8/5 or more times the first shortest distance L1 (see FIG. 1B) between the radio frequency filters 101, 103, 105, and 107 and the first cover ground layer 242 or the second cover ground layer 241.

In addition, the third shortest distance L3 (see FIG. 1A) between the radio frequency filters 101 and 105 and between the radio frequency filters 103 and 107 may be 6 or more times the first shortest distance L1.

The passive component 250 may be disposed on a lower surface of the radio frequency module and may be electrically connected to the IC 230 to provide impedance. For example, the passive component 250 may include at least a portion of a capacitor (e.g., a multilayer ceramic capacitor (MLCC)), an inductor, and a chip resistor. At least portions of the passive component 250 and the IC 230 may be encapsulated by an encapsulant (e.g., a photo imagable encapsulant (PIE), an Ajinomoto build-up film (ABF), or an epoxy molding compound (EMC)).

The core member 260 may be configured to pass a base signal. For example, the core member 260 may include a core via through which the base signal passes, and may include electrical structures (e.g., solder balls, pins, and lands) electrically connected to the core vias and connected to outside components.

The IC 230 may perform at least some of a frequency conversion, an amplification, a filtering, a phase control, and a power generation to thereby generate a converted radio frequency signal.

In addition, the IC 230 may receive the base signal through the core member 260 and may transmit a radio frequency signal having a frequency higher than the frequency of the base signal to the patch antennas 211 and 213. The base signal may be an intermediate frequency (IF) signal or a baseband signal and may have frequencies (e.g., 2 GHz, 5 GHz, 10 GHz, and the like) lower than the frequencies (e.g., 24 GHz, 28 GHz, 36 GHz, 39 GHz, and 60 GHz) of the radio frequency signal.

The radio frequency signal may have a fundamental frequency of greater than or equal to 20 GHz and less than or equal to 80 GHz.

Figure 8A:
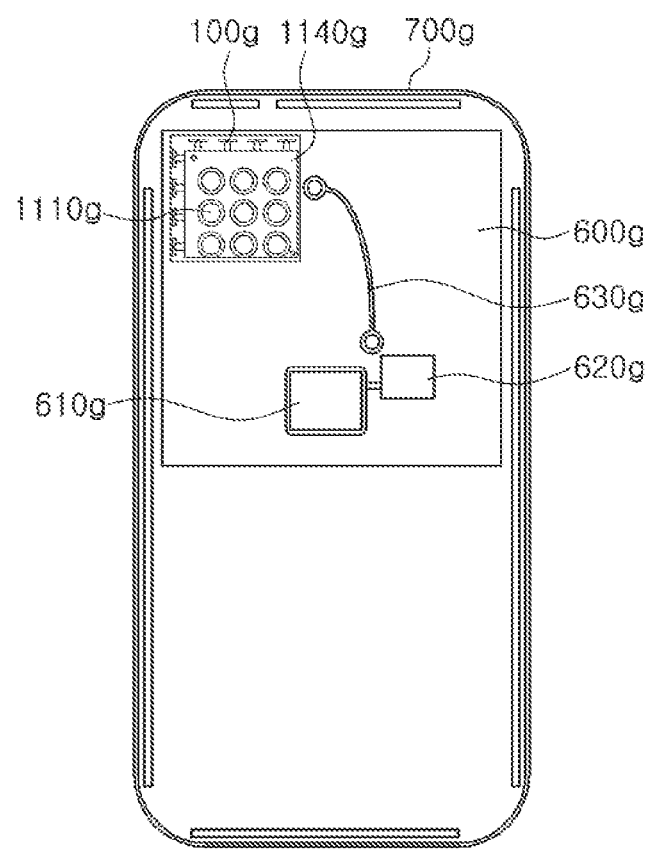
FIGS. 8A and 8B are plan views illustrating layouts of a radio frequency filter apparatus and a radio frequency module in an electronic device, according to embodiments.
Figure 8B:
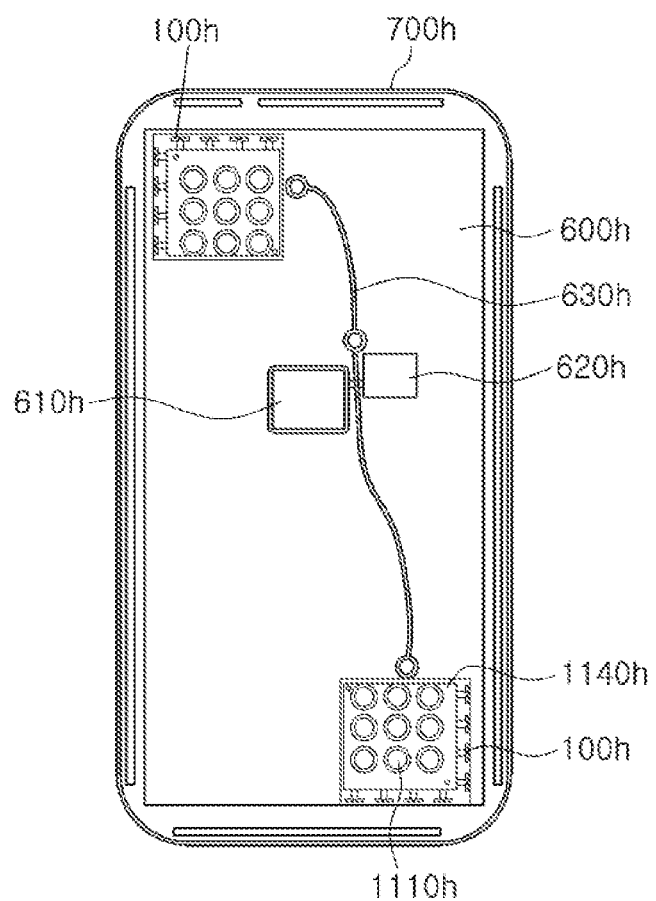

FIGS. 8A and 8B are plan views illustrating layouts of a radio frequency filter apparatus and a radio frequency module in an electronic device, according to embodiments.

Referring to FIG. 8A, a radio frequency module 100g including a patch antenna pattern 1110g and an insulating layer 1140g may be disposed to be adjacent to a side boundary of an electronic device 700g on a set board 600g of the electronic device 700g.

The electronic device 700g may be a smartphone, a personal digital assistant, a digital video camera, a digital still camera, a network system, a computer, a monitor, a tablet, a laptop, a netbook, a television, a video game, a smartwatch, an automotive component, or the like, but is not limited to these examples.

A communications module 610g and a baseband circuit 620g may be further disposed on the set board 600g. The radio frequency module 100g may be electrically connected to the communications module 610g and/or the baseband circuit 620g through a coaxial cable 630g.

The communications module 610g may include at least a portion of a memory chip such as a volatile memory (for example, a DRAM), a non-volatile memory (for example, a ROM), a flash memory, or the like; an application processor chip such as a central processor (for example, a CPU), a graphics processor (for example, a GPU), a digital signal processor, a cryptographic processor, a microprocessor, a microcontroller, or the like; and a logic chip such as an analog-digital converter, an application-specific IC (ASIC), or the like to perform a digital signal processing.

The baseband circuit 620g may generate a base signal by performing analog-digital conversion, and amplification, filtering, and frequency conversion of an analog signal. The base signal input to and output from the baseband circuit 620g may be transmitted to the radio frequency module 100g through a cable.

For example, the base signal may be transmitted to the IC through an electrical connection structure, a core via, and a wiring. The IC may convert the base signal into a radio frequency signal of a millimeter wave (mmWave) band.

Referring to FIG. 8B, radio frequency modules 100h each including a patch antenna pattern 1110h and an insulating layer 1140h may be disposed to be adjacent to a boundary of one side surface of an electronic device 700h and a boundary of another side surface of the electronic device 700h, respectively, on a set board 600h of the electronic device 700h. A communications module 610h and a baseband circuit 620h may be further disposed on the set board 600h. The radio frequency modules 100h may be electrically connected to the communications module 610h and/or the baseband circuit 620h through a coaxial cable 630h.

The ring-type pattern, the port, the via, the patch antenna, and the ground layer disclosed herein may include a metal material (e.g., a conductive material such as copper (Cu), aluminum (Al), silver (Ag), tin (Sn), gold (Au), nickel (Ni), lead (Pb), titanium (Ti), or an alloy thereof), and may be formed by a plating method such as chemical vapor deposition (CVD), physical vapor deposition (PVD), sputtering, subtractive, additive, semi-additive process (SAP), modified semi-additive process (MSAP), or the like, but is not limited to these examples.

The insulating layer (e.g., the insulating layer 1140g or 1140h) may be filled in at least a portion of a space between the ring-type pattern, the port, the via, the patch antenna, and the ground layer disclosed herein. For example, the insulating layer may be formed of FR4, liquid crystal polymer (LCP), low temperature co-fired ceramic (LTCC), a thermosetting resin such as an epoxy resin, a thermoplastic resin such as a polyimide resin, a resin in which the thermosetting resin or the thermoplastic resin is impregnated together with an inorganic filler in a core material such as a glass fiber (or a glass cloth or a glass fabric), for example, prepreg, Ajinomoto Build up Film (ABF), FR-4, Bismaleimide Triazine (BT), a photo imagable dielectric (PID) resin, generic copper clad laminate (CCL), or a glass or ceramic based insulating material.

The RF signal disclosed herein may have a format according to wireless fidelity (Wi-Fi) (Institute of Electrical And Electronics Engineers (IEEE) 802.11 family, or the like), worldwide interoperability for microwave access (WiMAX) (IEEE 802.16 family, or the like), IEEE 802.20, long term evolution (LTE), evolution data only (Ev-DO), high speed packet access+(HSPA+), high speed downlink packet access+(HSDPA+), high speed uplink packet access+ (HSUPA+), enhanced data GSM environment (EDGE), global system for mobile communications (GSM), global positioning system (GPS), general packet radio service (GPRS), code division multiple access (CDMA), time division multiple access (TDMA), digital enhanced cordless telecommunications (DECT), Bluetooth, 3G, 4G, and 5G protocols, and any other wireless and wired protocols designated after the abovementioned protocols, but is not limited to these examples.

As set forth above, according to embodiments disclosed herein, the radio frequency filter apparatus and the radio frequency module may integrate a plurality of radio frequency filters in a predetermined region while substantially preventing the deteriorations in performance (e.g., insertion loss, isolation, electromagnetic noise characteristics, etc.) of the radio frequency filters.

The communications modules 610g and 610h in FIGS. 8A and 8B that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radio frequency filter apparatus, comprising:
    radio frequency filters each having a first ring-type pattern extended from a respective first port and a second ring-type pattern extended from a respective second port;
    a cover ground layer disposed on or below the radio frequency filters and disposed to cover at least a portion of each of the radio frequency filters; and
    a surrounding ground layer disposed to surround at least a portion of each of the radio frequency filters along outer boundaries of the radio frequency filters,
    wherein the surrounding ground layer is spaced apart from radio frequency filters such that a shortest distance between the radio frequency filters and the surrounding ground layer is 8/5 or more times a shortest distance between the radio frequency filters and the cover ground layer.

2. The radio frequency filter apparatus of claim 1, wherein a shortest distance between pairs of the first ring-type pattern and the second ring-type pattern is shorter than the shortest distance between the radio frequency filters and the surrounding ground layer.

3. The radio frequency filter apparatus of claim 2, wherein a shortest distance from a portion of each of the first ring-type pattern and the second ring-type pattern to an opposite portion of the first ring-type pattern and the second ring-type pattern, respectively, is longer than the shortest distance between the radio frequency filters and the surrounding ground layer.

4. The radio frequency filter apparatus of claim 3, wherein a thickness of each of the radio frequency filters is greater than or equal to 0.2 times and less than or equal to 0.4 times the shortest distance between the radio frequency filters and the cover ground layer.

5. The radio frequency filter apparatus of claim 4, wherein the radio frequency filters are disposed such that a shortest distance between adjacent radio frequency filters among the radio frequency filters is 6 or more times the shortest distance between the radio frequency filters and the cover ground layer.

6. The radio frequency filter apparatus of claim 5, wherein at least a portion of the pairs of the first ring-type pattern and the second ring-type pattern has a pair of slits, and
    slits of the pair of slits are disposed at positions facing each other in a corresponding ring-type pattern among the first ring-type pattern and the second ring-type pattern.

7. The radio frequency filter apparatus of claim 6, further comprising an internal ground layer disposed inside of at least a portion of one of the first ring-type pattern and the second ring-type pattern,
    wherein a shortest distance between the one of the first ring-type pattern and the second ring-type pattern and the internal ground layer is 8/5 or more times the first shortest distance.

8. A radio frequency filter apparatus, comprising:
    radio frequency filters each having a first ring-type pattern extended from a respective first port and a second ring-type pattern extended from a respective second port;
    a cover ground layer disposed on or below the radio frequency filters and disposed to cover at least a portion of each of the radio frequency filters; and a surrounding ground layer disposed to surround at least a portion of each of the frequency filters along outer boundaries of the radio frequency filters, wherein the radio frequency filters are disposed such that a shortest distance between adjacent radio frequency filters among the radio frequency filters is 6 or more times a shortest distance between the radio frequency filters and the cover ground layer.

9. The radio frequency filter apparatus of claim 8, wherein a shortest distance from a portion of each of the first ring-type pattern and the second ring-type pattern to an opposite portion of the first ring-type pattern and the second ring-type pattern, respectively, is longer than the shortest distance between the adjacent radio frequency filters among the radio frequency filters.

10. The radio frequency filter apparatus of claim 9, wherein a thickness of each of the radio frequency filters is greater than or equal to 0.2 times and less than or equal to 0.4 times the shortest distance between the radio frequency filters and the cover ground layer.

* * * * *